April 22, 1947.  C. C. S. LE CLAIR  2,419,454
APPARATUS FOR DETECTING AND INDICATING AND/OR
MEASURING ICE FORMATION ON VEHICLES
Filed Dec. 17, 1943  2 Sheets-Sheet 1
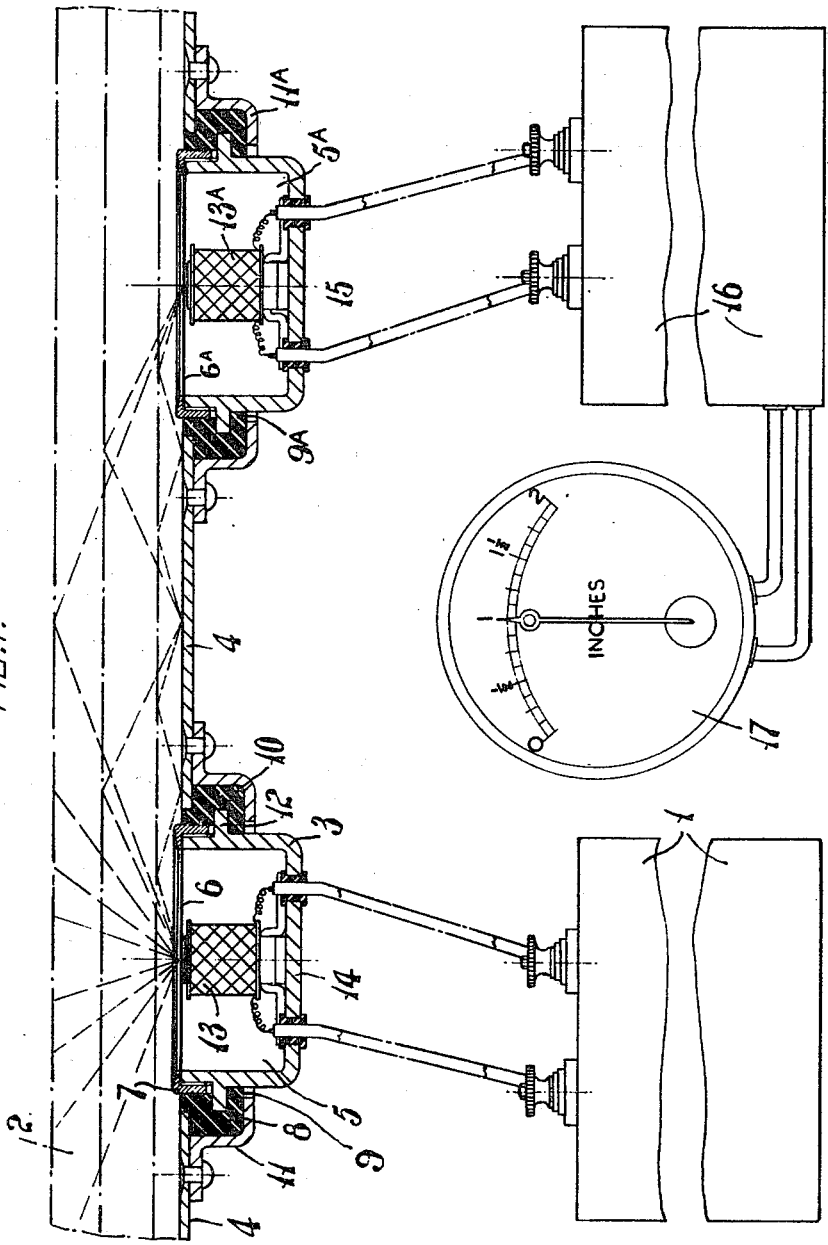
Inventor
Camille Clare Spronkling LeClair
By McCaleb, Wendt & Dickinson
His Attorneys.

April 22, 1947. C. C. S. LE CLAIR 2,419,454
APPARATUS FOR DETECTING AND INDICATING AND/OR
MEASURING ICE FORMATION ON VEHICLES
Filed Dec. 17, 1943 2 Sheets-Sheet 2
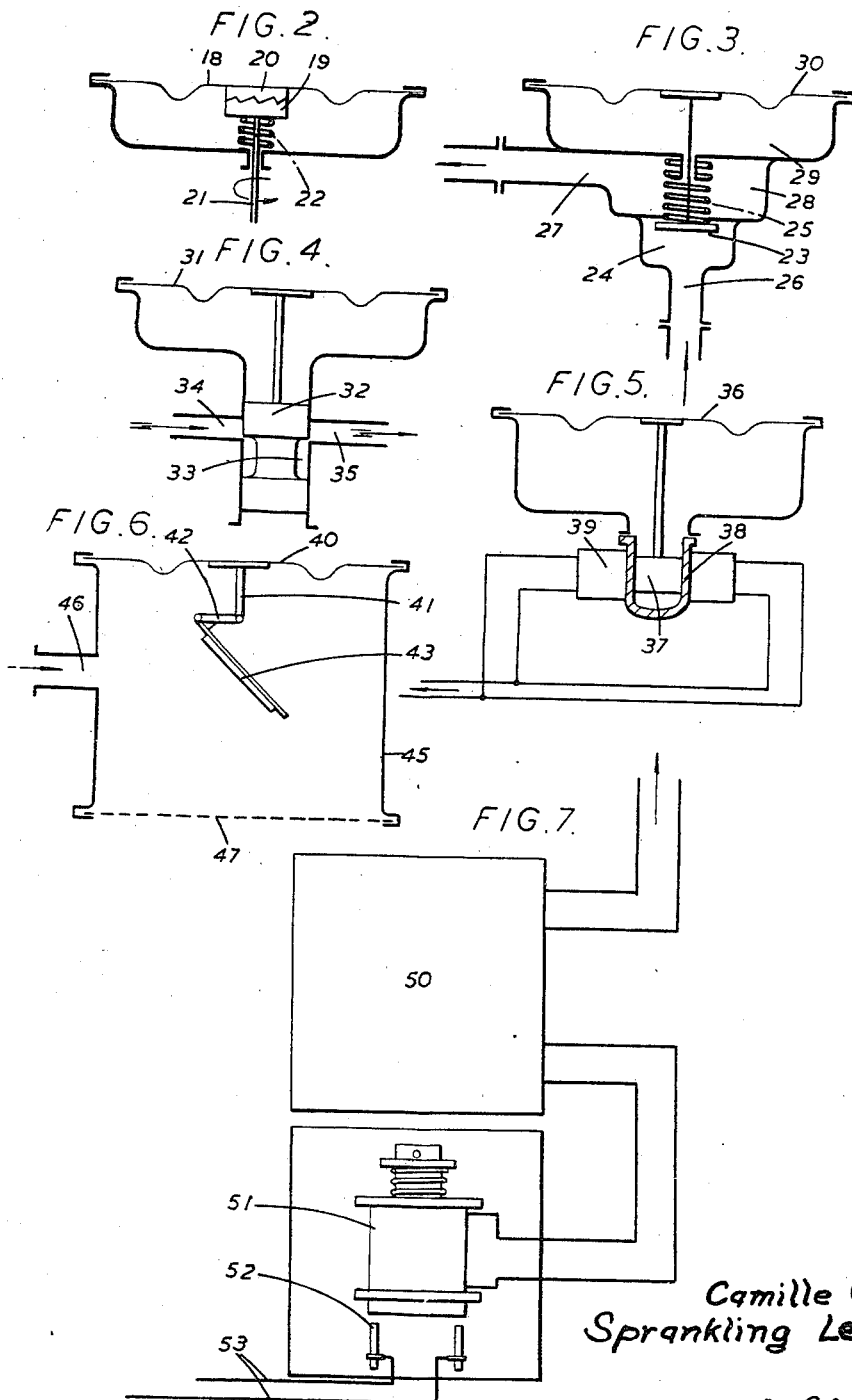
Camille Clare
Sprankling LeClair
Inventor Patented Apr. 22, 1947

2,419,454

UNITED STATES PATENT OFFICE 2,419,454

APPARATUS FOR DETECTING AND INDICATING AND/OR MEASURING ICE FORMATION ON VEHICLES

Camille Clare Sprankling Le Clair,
Acton, London, England

Application December 17, 1943, Serial No. 514,635
In Great Britain January 26, 1943

14 Claims. (Cl. 244—134)

This invention relates to apparatus adapted to detect and indicate the presence of ice, and, if desired, also to measure the thickness of the ice, formed on surfaces such as on vehicles, and particularly on the wings and other parts of aircraft.

Known methods of ice detection and measurement suffer from various limitations, viz., the detecting and measuring apparatus may be put out of operation due to the formation of ice, the apparatus requires de-icing at intervals, usually by means incorporated in the detecting device, and in the case of electrostatic ice-detecting and measuring apparatus, these may give false readings or may be put out of action by the presence on the detecting surface of de-icing fluids and water.

One object of the present invention, therefore, is to provide ice-detecting and indicating and/or measuring apparatus in which the ice-detecting sensitive surfaces are de-iced by the same method as that used for de-icing the parts of the vehicle wherein the apparatus is installed.

According to the present invention, I provide apparatus for detecting and indicating the presence of and/or measuring the thickness of an ice film formed upon a surface, characterised by the feature that it comprises a sound wave emitting means mounted in, upon or adjacent to the surface and from which sound waves or vibrations are emitted, a sound-wave detecting means or receiver which is also arranged in, upon or adjacent to, the surface in spaced relationship from the emitter, whereby part of the sound-wave energy emitted by the emitter is transmitted to the receiver, the proportion so transmitted being in functional relationship to the thickness of any ice film which may form on said surface. Thus, the energy of the sound received by the receiver can be made use of to actuate an ice-thickness measuring instrument which may be in the form of an output meter connected to the receiver.

The invention is, of course, not limited to emitting means in which the sound waves are produced electrically, but may be applied to means in which the sound waves are produced by mechanical, pneumatic, or hydraulic means.

The invention is also not limited to apparatus wherein the receiving means converts the sound energy into electrical currents, but may be applied to receiving means wherein the sound energy is used to control the passage of a fluid, or to produce heat which may be detected by any known means. The receiving means may also be used to operate visual or audible means for indicating the formation and thickness of the ice film.

Constructional forms of the invention, all applied to the detection and measurement of ice films forming on the wings of an aircraft, are shown, diagrammatically and by way of example, on the accompanying drawings, whereon:

Fig. 1 is a view partly in section, of one arrangement and shows the emitter, receiver, amplifiers and output meter;

Fig. 2 shows mechanical means for vibrating the emitter diaphragm;

Fig. 3 shows hydraulic means for vibrating the emitter diaphragm;

Fig. 4 shows means for using the sound energy to control the passage of a fluid;

Fig. 5 shows means for using the sound energy to produce heat;

Fig. 6 shows a method of using the receiver to operate visual means for indicating the formation and thickness of the ice film; and Fig. 7 shows a method of using the output energy to control the operation of a de-icing pump motor.

Referring first to Fig. 1: This construction comprises an oscillator 1 for producing alternating electric current. The frequency of this current corresponds to that of the sound waves to be emitted into and through the ice film 2, the waves being within the audible frequency range or of supersonic frequency. Although the vibration emitting instrumentality may be of the electro-dynamic type or may utilize the principles of magneto-striction or piezo-electric phenomenon, I have shown for purposes of illustration a wave emitter 3 of the electro-magnetic type which is secured within the surface 4 of the leading edge of the wing and comprises a casing 5 having an open mouth which is closed by a sensitive surface in the form of a diaphragm 6 clamped at its periphery on to the casing by an apertured ring 7 screwed upon the casing. A hole is formed in the surface 4 of the leading edge of the wing and the neck 8 of an annular rubber mounting 9 is fitted in the hole, the body 10 of the mounting being housed within an annular cage 11 which is secured to the inside of the wing. The mounting is shaped to engage an external flange 12 on the casing, and the latter is thus supported resiliently inside the wing with the diaphragm 6 substantially flush with the outer surface of the wing. Exciter coils 13 are fixed in the casing between the base 14 and the diaphragm 6 and they are connected by leads to the said oscillator 1.

At a predetermined distance along the span of the wing, the latter is formed with another hole in the surface of its leading edge which is equal in diameter to the first mentioned hole 4. A vibration or wave receiver 15, corresponding in all respects to the emitter, is mounted within the wing at the back of the hole in the same manner as the emitter. Thus, the receiver comprises a casing 5A closed by a diaphragm 6A, a rubber mounting 9A in a cage 11A and receiver coils 13A. The coils 13A of the supersonic receiver are connected by leads to an amplifier 16, the output of which is connected to an output meter 17 calibrated (for instance, in inches and fractions thereof) to show the thickness of an ice-film 2 formed upon the aerofoil surface.

Sound waves emitted by the emitter 3 radiate as indicated by the broken lines in the drawing, mostly in a forward direction perpendicular to the surface of the emitter diaphragm 6, but also in a sheaf obliquely thereto. If no ice is present, these emissions are lost, none of them reaching the receiver diaphragm 6a, which consequently shows a zero reading on the output meter 17. If a coating of ice is present, some of the more oblique sound waves are reflected back and forth between the two surfaces of the ice layer, until some of them reach the receiver. If the ice coating is very thin, then, as shown by the broken lines in the drawing, the waves must be reflected to and fro many times before reaching the receiver, which consequently receives but a very small proportion of those emitted and, therefore, shows a very small reading on the output meter 17. As the ice layer thickens, the number of reflections becomes less, with a correspondingly stronger reception by the receiver, and the receiver consequently shows a bigger reading on the output meter 17.

The invention is, of course, not limited to emitting means in which the sound waves are produced electrically, but may be applied to means in which the sound waves are produced by mechanical, pneumatic or hydraulic means.

Thus, referring to Fig. 2, the diaphragm 18 of the emitter may be vibrated by a rotating toothed wheel 19, the teeth of which vibrate a toothed interference member 20 attached to the diaphragm as in a Klaxon horn. The wheel 19 is mounted upon a shaft 21 and is held in frictional engagement with the member 20 by a spring 22.

The hydraulic means for vibrating the emitter diaphragm may utilize a principle similar to that of the well known hydraulic ram. For instance, see Fig. 3, a valve 23 may be arranged in a valve chamber 24 and normally held open by a spring 25 which is strong enough to open it against the static pressure of the liquid entering the chamber through an inlet pipe 26. When the valve is open, liquid flows from the inlet pipe, through the valve chamber, past the valve and out of the outlet 27 from a chamber 28 arranged between the valve chamber 24 and the diaphragm chamber 29. The impact of this flowing liquid on the valve 23 plus the working pressure causes the valve to shut. As soon as the valve is shut, the flow and, hence, the impact stops, so that the valve, which is now subjected to static pressure only, reopens by the action of its spring 25 and the cycle of operations repeats itself. The vibratory action thus set up by the valve may be used to vibrate the emitter diaphragm 30 to which the valve is connected.

It will be understood that the above method of vibrating the emitter diaphragm may also be used for pneumatic operation.

The diaphragm may also be vibrated pneumatically by utilizing the well known principle of the pneumatic riveter, the reciprocating motion of the piston being used to vibrate the emitter diaphragm.

In cases in which the diaphragm is vibrated by mechanical, hydraulic or pneumatic methods, it may be found necessary to provide a sheath of sheet metal or similar material over the face of the diaphragm to keep the ice from forming actually on the diaphragm itself and thereby locking it and preventing its motion. When the diaphragm is vibrated electrically this is not necessary since even if it is ice bound the vibratory effect of electric current alternations will still be present and will cause the apparatus to function. In the case of the mechanical, hydraulic or pneumatic methods, such binding by the effect of the ice would lock the apparatus and prevent its proper operation.

The invention is also not limited to apparatus wherein the receiving means converts the sound energy into electrical current, but may be applied to receiving means wherein the sound energy is used to control the passage of a fluid, or to produce heat which may be detected by any known means.

Referring to Fig. 4, if the sound energy is to be used to control the passage of fluid, the receiver diaphragm 31 may be attached to a valve 32, say of the piston type, which is arranged in a valve chamber 33 having an inlet 34 and outlet 35 and is adjusted to give a mean opening.

Fluid is admitted to the valve chamber 33 through the inlet 34 whose area is also the equivalent of the mean valve opening referred to above, and the arrangement is such that the flow is turbulent and there is a pressure drop through the inlet and also past the valve. Since the flow is turbulent, the pressure drop varies as the flow squared or, in other words, the flow varies as the square root of the pressure drop. If the valve 32 is vibrated by the receiver diaphragm 31 from a minimum to a maximum valve opening which are respectively less and greater than the mean valve opening, then the total mean flow past the valve is reduced.

The amount of reduction of flow will vary with the amount of vibration and may be used as a measurement of the latter, and hence as a measurement of the thickness of the ice film.

In order to bring about the production of heat, the receiver diaphragm 36, see Fig. 5, may be attached to a friction device such as a piston 37 in a cylinder 38. The vibration of the diaphragm 36 causes the piston 37 to reciprocate in the cylinder 38 and the amount of movement and hence the amount of friction and the amount of heat produced is a function of the amount of vibration of the diaphragm, i. e., of the thickness of the ice film. The amount of heat produced can be measured by a thermo-couple 39 and this reading can be used as an indication of the thickness of the ice film.

The receiving means may also be used to operate visual or audible means for indicating the formation and thickness of the ice film.

Referring to Fig. 6, in order to operate visual means, the receiver diaphragm 40 may be connected by a link 41 and crank 42 to a mirror 43 which is mounted on a pivot and is connected to the crank. The link, the crank and the mirror are mounted in a casing 45 and a beam of light enters the casing through an opening 46 from a fixed source and is reflected by the mirror to form a spot (or line) on a scale provided on a screen 47 closing the casing. When the receiver diaphragm 40 vibrates, it causes the mirror to vibrate so that the spot light on the scale is caused to vibrate over a range. The amount of such movement is clearly proportional to the amount of vibration of the diaphragm and may be used as a means of measuring the vibration and hence as a means of measuring the thickness of the ice film.

It will be clear to those skilled in the art, that in order to operate audible means, a voice pipe may be taken directly off the back of the receiver diaphragm box such that the sounds produced are transmitted direct to the ear of the operator or to such other sound directing and/or amplifying devices (such as a microphone and loud speaker) as may be convenient.

The output current from the amplifier 50 may, as shown in Fig. 7, be taken to a relay switch 51 of the type in which the contacts 52 are closed when the amplifier current reaches or exceeds a predetermined value, i. e., when the ice reaches a predetermined thickness. When the contacts are closed, current will flow through the leads 53, the de-icing pump motor (not shown) will be started, and de-icing fluid will be supplied to the wing or other surfaces.

It will be appreciated that the diaphragms 6 and 6A need not be flat. For instance, they could be conical or curved to agree with the wing contour.

This invention does not depend on the adoption of sound energy emission of any particular frequency but may be adapted to any frequency, e. g., audible sound or supersonic vibrations.

The application of the invention to vehicles other than aircraft and to parts of aircraft other than wings will be well understood from the foregoing description.

I claim:

1. In apparatus for indicating the presence of or measuring the thickness of an ice film on a surface, the combination, comprising, a directional sound wave emitting means mounted adjacent said surface and from which sound waves are emitted in a predetermined direction, directional sound wave detecting means also mounted adjacent to the surface in laterally displaced relationship from said emitting means, the directional characteristics and laterally displaced relationship of the emitting means and detecting means being such that the strength of sound waves from said emitting means and detected by the detecting means is a function of the thickness of an ice film on said surface.

2. In apparatus for indicating the presence of or measuring the thickness of an ice film on a surface, the combination comprising a directional sound wave emitting means adapted to be mounted for directing sound waves in a direction transversely away from said surface, directional sound wave detecting means adapted to be mounted in spaced relationship to the emitting means for receiving sound waves from a direction transversely away from said surface, the directional characteristics and spaced relationship of the detecting means with respect to the emitting means being such that the strength of sound waves received by the detecting means from the emitting means is a function of the thickness of an ice film on said surface.

3. In apparatus for indicating the presence of or measuring the thickness of an ice film on a surface, the combination comprising a directional sound wave emitting means adapted to be mounted for directing compressional waves of supersonic frequency in a direction transverse to said surface, directional compressional wave detecting means adapted to be mounted in spaced relationship to the emitting means for receiving reflected compressional waves of supersonic frequency from a direction transverse to the surface of said ice film, the directional characteristics and spaced relationship of the detecting means with respect to the emitting means being such that the strength of sound waves received by the detecting means from the emitting means is a function of the thickness of an ice film on said surface.

4. In apparatus for indicating the presence of or measuring the thickness of an ice film on a surface, the combination comprising an electrically actuated directional sound wave emitting means adapted to produce vibrations directed toward said surface in one direction, a source of alternating current of predetermined frequency connected to said emitting means and determining the frequency of the emitted sound waves, directional sound wave detecting means adapted to be mounted in laterally spaced relationship with respect to the emitting means for receiving sound waves the axial component of whose direction has been reversed from the direction of the axial component of the emitted waves, the directional characteristics and spaced relationship of the detecting means with respect to the emitting means being such that the said vibrations are carried to the detecting means by a film of ice on said surface.

5. In apparatus for indicating the presence of or measuring the thickness of an ice film on a surface, the combination comprising a directional sound wave emitting means adapted to be mounted for directing sound waves in a direction transverse to said surface, directional sound wave detecting means adapted to be mounted in side-by-side, laterally spaced and uni-directional relationship to the emitting means for receiving sound waves from a direction transverse to said surface, the directional and spaced relationships of the detecting means with respect to the emitting means being such that the strength of sound waves received by the detecting means from the emitting means is a function of the thickness of an ice film on said surface, said sound wave detecting means including an instrumentality for converting into electrical energy detected sound wave energy from the emitting means.

6. In apparatus for indicating the presence of or measuring the thickness of an ice film on a surface, the combination comprising a directional sound wave emitting means adapted to be mounted for directing sound waves in a direction transversely away from said surface, directional sound wave detecting means adapted to be mounted in side-by-side and spaced relationship to the emitting means for receiving reflected sound waves from a direction transverse to said surface, the directional characteristics and spaced relationship of the detecting means with respect to the emitting means being such that the strength of sound waves received by the detecting means from the emitting means is a function of the thickness of an ice film on said surface, said sound wave detecting means including an instrumentality for converting detected sound wave energy from the emitting means into electrical energy, an amplifier connected to the detecting means to receive electrical energy therefrom, and an indicating instrument connected to the amplifier and actuated by the output thereof.

7. In apparatus for indicating the presence of or measuring the thickness of an ice film on a surface, the combination comprising a directional sound wave emitting means adapted to be mounted for directing sound waves in a direction transverse to said surface, directional sound wave detecting means adapted to be mounted in spaced relationship to the emitting means along said surface for receiving sound waves from a direction transverse to said surface, said emitting means and said detecting means each including a vibratory diaphragm forming a part of said surface, the directional characteristics and spaced relationship of the detecting means with respect to the emitting means being such that the strength of sound waves received by the detecting means from the emitting means is a function of the thickness of an ice film on said surface.

8. In apparatus for indicating the presence of or measuring the thickness of an ice film on a surface, the combination comprising a directional sound wave emitting means adapted to be mounted for directing sound waves in a direction transversely away from said surface, directional sound wave detecting means adapted to be mounted in spaced relationship to the emitting means for receiving sound waves from a direction transverse to said surface and the axial component of whose direction has been reversed from the direction of the axial component of the emitted waves, the directional and spaced relationships of the detecting means with respect to the emitting means being such that the strength of sound waves received by the detecting means from the emitting means is a function of the thickness of an ice film on said surface, said sound wave detecting means including a diaphragm in position to receive vibrations transmitted from the emitting means through the ice film on said surface, and energy translating means for converting the received vibrations into electrical energy.

9. In apparatus for indicating the presence of or measuring the thickness of an ice film on a surface, the combination comprising a directional sound wave emitting means adapted to be mounted for directing sound waves in a direction transverse to the surface, said sound wave emitting means including a vibratory diaphragm forming a part of said surface, directional sound wave detecting means adapted to be mounted in spaced relationship with respect to the emitting means, said detecting means including a diaphragm in position to receive sound waves carried thereto along said surface through the ice film from the emitting means and having energy translating means for converting the received sound waves into electrical energy.

10. In apparatus for indicating the presence of or measuring the thickness of an ice film on a surface, the combination comprising a directional sound wave emitting means adapted to be mounted for directing sound waves in a direction transverse to said surface, directional sound wave detecting means adapted to be mounted in spaced relationship to the emitting means for receiving sound waves from a direction transverse to said surface and carried thereto through the ice film, the directional and spaced relationships of the detecting means with respect to the emitting means being such that the strength of sound waves received by the detecting means from the emitting means is a function of the thickness of an ice film on said surface, said sound wave detecting means including an instrumentality for converting detected sound wave energy from the emitting means into electrical energy, an amplifier connected to the detecting means to receive electrical energy therefrom, and a visual indicating instrument connected to the amplifier and actuated by the output thereof, said indicating instrument being calibrated in units of the thickness of the ice film.

11. In apparatus for controlling de-icing equipment to prevent the accumulation of an excessive film of ice on a surface, the combination comprising sound wave emitting means having support means for securing it in a position relative to said surface to transmit sound waves transversely into said ice film, a directional sound wave detecting means having support means for holding it in a position relative to said surface to receive sound waves carried through said ice film from the emitting means and reflected from at least one surface of the ice film, said emitting means and detecting means respectively having directional emitting and detecting elements such that when they are displaced relative to each other laterally of the surface the strength of the sound waves received by the detecting means is a function of the thickness of the ice film on said surface, and a control instrumentality connected to the detecting means for effecting operation of the de-icing equipment.

12. In apparatus for indicating the presence of or measuring the thickness of an ice film on a surface, the combination comprising a directional sound wave emitting means adapted to be mounted adjacent said surface, mechanical means for actuating the emitting means, and from which emitting means sound waves are emitted in a predetermined direction, directional sound wave detecting means also adapted to be mounted adjacent to the surface in spaced relationship along said surface from said emitting means, the directional characteristics and spaced relationship of the emitting means and detecting means with respect to said surface being such that the strength of sound waves from said emitting means and detected by the detecting means is a function of the thickness of an ice film on said surface.

13. In apparatus for indicating the presence of or measuring the thickness of an ice film on a surface, the combination comprising a directional sound wave emitting means mounted adjacent said surface, hydraulic means for actuating the emitting means, and from which emitting means sound waves are emitted in a predetermined general direction substantially normal to the surface, directional sound wave detecting means also mounted adjacent to the surface in spaced relationship from said emitting means along the surface, the directional characteristics and spaced relationship of the emitting means and directing means being such that the strength of sound waves from said emitting means and detected by the detecting means is a function of the thickness of an ice film on said surface.

14. In apparatus for indicating the presence of or measuring the thickness of an ice film on a surface, the combination comprising a directional sound wave emitting means mounted adjacent said surface, and from which sound waves are emitted in a predetermined direction, directional sound wave detecting means also mounted adjacent to the surface in spaced relationship from said emitting means, the directional and spaced relationships of the emitting means and detecting means being such that the strength of sound waves from said emitting means and detected by the detecting means is a function of the thickness of an ice film on said surface, and means connected to said detecting means for translating the output thereof into heat energy.

CAMILLE CLARE SPRANKLING LE CLAIR.

REFERENCES CITED

The following references are of record in the file of this patent:

UNITED STATES PATENTS

| Number | Name | Date |
|---|---|---|
| 1,562,950 | Fessenden | Nov. 24, 1925 |
| 2,063,949 | Pierce | Dec. 15, 1936 |
| 2,248,870 | Langevin | July 8, 1941 |
| 1,858,931 | Langevin, et al. | May 17, 1932 |
| 2,159,186 | Tyler | May 23, 1939 |
| 2,182,530 | Baer | Dec. 5, 1939 |
| 2,182,547 | Tumey | Dec. 5, 1939 |

FOREIGN PATENTS

| Number | Country | Date |
|---|---|---|
| 506,843 | British | June 6, 1939 |